(12) United States Patent
Tanaka (10) Patent No.: US 6,701,986 B2
(45) Date of Patent: Mar. 9, 2004

(54) RUN-FLAT TIRE WITH TREAD REINFORCING RUBBER LAYER

(75) Inventor: Masatoshi Tanaka, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 0 days.

(21) Appl. No.: 09/892,768

(22) Filed: Jun. 28, 2001

(65) Prior Publication Data

US 2002/0014295 A1 Feb. 7, 2002

(30) Foreign Application Priority Data

Jun. 28, 2000 (JP) ......................... 2000-194957

(51) Int. Cl.[7] .............. B60C 3/00; B60C 9/18; B60C 9/22; B60C 11/00; B60C 11/01; B60C 17/00
(52) U.S. Cl. ............... 152/209.14; 152/454; 152/517; 152/531; 152/532; 152/537
(58) Field of Search ............... 152/532, 517, 152/537, 531, 209.14, 454

(56) References Cited

U.S. PATENT DOCUMENTS 5,988,247 A * 11/1999 Tanaka ................ 152/517
6,237,661 B1 * 5/2001 Asano ................ 152/209.14

FOREIGN PATENT DOCUMENTS

| EP | 0 605 177 A1 | 7/1994 |
|---|---|---|
| FR | 2 425 334 A | 12/1979 |
| FR | 2 460 218 A | 1/1981 |
| WO | WO 99/48710 | 9/1999 |

* cited by examiner

Primary Examiner—Adrienne C. Johnstone
(74) Attorney, Agent, or Firm—Birch, Stewart, Kolasch & Birch, LLP (57) ABSTRACT

A pneumatic tire comprises a tread portion, a pair of sidewall portions, a pair of bead portions, a carcass extending between the bead portions, and a tread reinforcement disposed radially outside the carcass in the tread portion. The tread reinforcement comprises a reinforcing rubber layer and a radially outer reinforcing cord layer. The radially outer reinforcing cord layer is made of cords disposed radially outside the reinforcing rubber layer. The reinforcing rubber layer extends across the substantially overall tread width and made of a rubber material having a hardness of not less than 70 degrees and a loss tangent of not more than 0.15. In a tire meridian section, the thickness of the reinforcing rubber layer being in a range of not less than 2 mm at the tire equator and gradually decreasing towards the axial edges of the reinforcing rubber layer.

7 Claims, 6 Drawing Sheets

250 ## RUN-FLAT TIRE WITH TREAD REINFORCING RUBBER LAYER

The present invention relates to a pneumatic tire improved in run-flat performance.

BACKGROUND OF THE INVENTION

Recently, there have been marketed run-flat tires whose sidewall is reinforced by a hard rubber layer having a specific cross sectional shape so as to be strong enough to temporarily support the car without the help of air pressure.

In such run-flat tires, the ground pressure greatly increases in the tread shoulder region, and in contrast therewith, the ground pressure in the tread crown greatly decreases. As a result, heat generation and tread rubber wear is accelerated in the tread shoulder region and finally the tire is broken. Further, because of the irregular ground pressure distribution, it is difficult for the flat tire to produce a sufficient cornering power. Therefore, stability during cornering is not good.

SUMMARY OF THE INVENTION

It is therefore, an object of the present invention to provide a pneumatic tire, in which run-flat performance such as runable distance is further improved and at the same time cornering stability is also improved.

According to the present invention, a pneumatic tire comprises a tread portion, a pair of sidewall portions, a pair of bead portions, a carcass extending between the bead portions, and a tread reinforcement disposed radially outside the carcass in the tread portion and comprising a reinforcing rubber layer and a radially outer reinforcing cord layer, the radially outer reinforcing cord layer made of cords disposed radially outside the reinforcing rubber layer, the reinforcing rubber layer extending across the substantially overall tread width and made of a rubber material having a hardness of not less than 70 degrees and a loss tangent of not more than 0.15, in a tire meridian section, the thickness of the reinforcing rubber layer being in a range of not less than 2 mm at the tire equator and gradually decreasing towards the axial edges of the reinforcing rubber layer.

The tread reinforcement may be formed to include a radially inner reinforcing cord layer between the reinforcing rubber layer and the carcass. In this case, it is preferable that the inner reinforcing cord layer includes a ply of cords laid at an angle of substantially 90 degrees with respect to the tire equator.

The radially outer reinforcing cord layer and/or the radially inner reinforcing cord layer may include a belt ply made of cords laid at an angle of from 10 to 30 degrees with respect to the tire equator.

The outer reinforcing cord layer may include a band ply made of organic fiber cords, whose cord angles are not more than 5 degrees with respect to the tire equator, alone or in combination with the belt ply.

In this invention, the "hardness" of rubber means a hardness measured with a type-A durometer according to Japanese Industrial Standard K6253.

The loss tangent is measured under a temperature of 70 degrees C., a frequency of 10 Hz, and a dynamic distortion of plus/minus 2%.

The tread width is defined as the maximum axial width of the ground contacting area under a standard loaded condition in which the tire is mounted on a standard rim and inflated to a standard load and then loaded with a standard load. The standard rim is the "standard rim" specified in JATMA, the "Measuring Rim" in ETRTO, the "Design Rim" in T&RA or the like. The standard pressure is the "maximum air pressure" in JATMA, the "Inflation Pressure" in ETRTO, the maximum pressure given in the "Tire Load Limits at Various Cold Inflation Pressures" table in T&RA or the like. In case of passenger car tires, however, 180 kPa is used as the standard pressure.

The standard load is defined as the "maximum load capacity" in JATMA, 70% of the "Load Capacity" in ETRTO, the maximum value given in the above-mentioned table in T&RA or the like.

Further, a standard unloaded condition is defined such that the tire is mounted on the standard rim and inflated to the standard pressure, but loaded with no tire load.

An embodiment of the present invention will now be described in detail in conjunction with the accompanying drawings.

DETAILED DESCRIPTION OF THE DRAWINGS

In the drawings, pneumatic tire 1 according to the present invention comprises a tread portion 2, a pair of sidewall portions 3, a pair of bead portions 4 each with a bead core 5 therein, a carcass 6 extending between the bead portions 4, and a tread reinforcement 7 disposed radially outside the carcass 6 in the tread portion 2.

In this embodiment, the pneumatic tire 1 is a radial tire for passenger cars.

Figure 1:
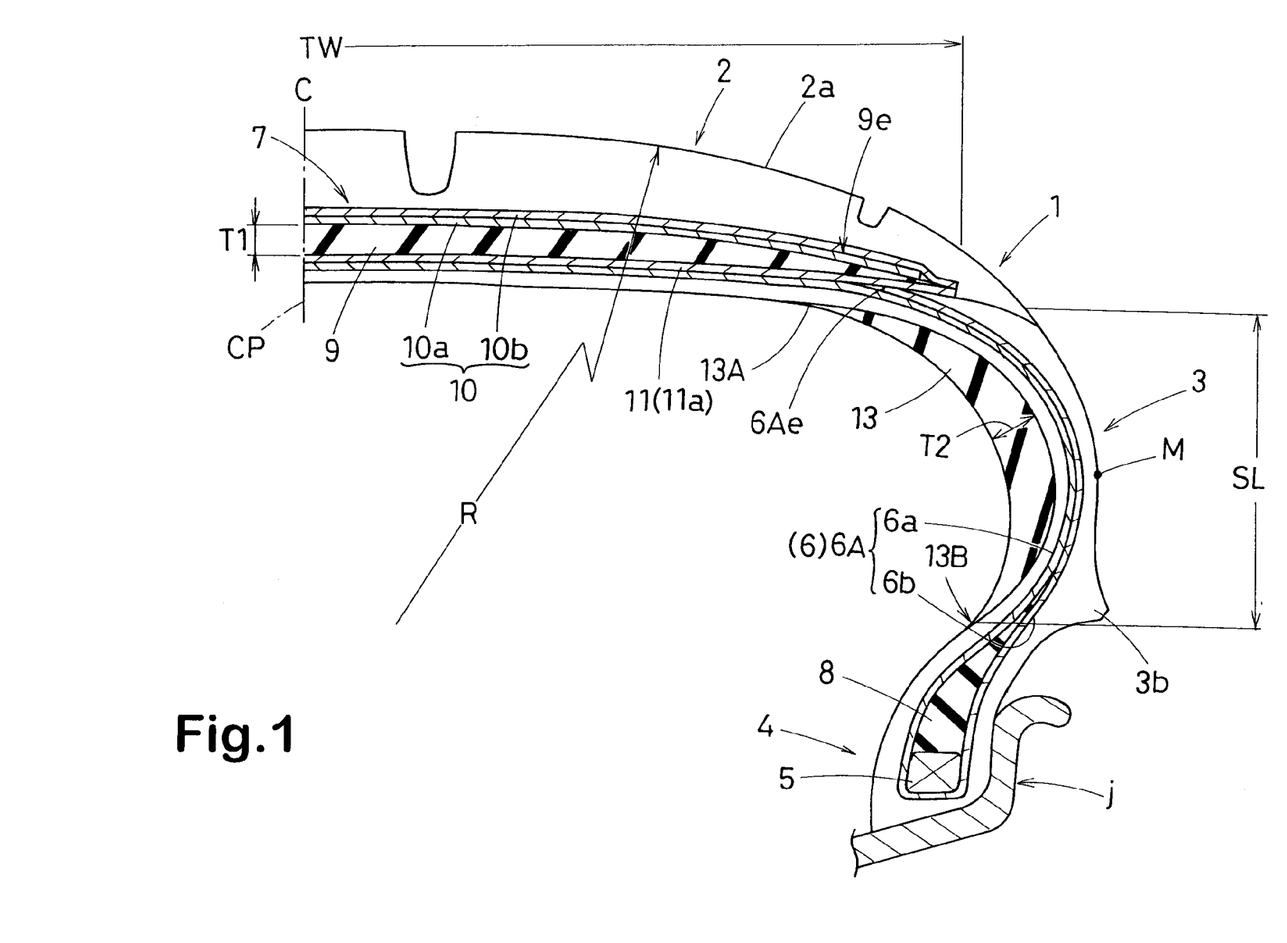
FIG. 1 is a cross sectional view of a pneumatic tire according to the present invention which shows an example of the tread reinforcement and an exemplary tire base structure.

In a meridian section of the pneumatic tire under the standard unloaded condition, the tire has a tread profile 2a whose radius R of curvature gradually decreases towards the axially outside of the tire from the tire equator C.

In this example, such gradual decreasing of the radius of curvature continues to a maximum tire section width point M in each of the sidewall portions 3. And such a profile is collectively formed by a plurality of circular arcs.

The maximum tire section width point M is defined as a point on the outer surface of the tire at a radial height corresponding to the maximum section width point of the carcass under the standard unloaded condition.

The carcass 6 is composed of at least one ply, in this example only one ply 6A of cords arranged radially at an angle of 75 to 90 degrees with respect to the tire equator C.

For the carcass cords, organic fiber cords, e.g. polyester, nylon, rayon, aramid and the like and steel cords may be used.

The carcass ply 6A extends between the bead portions 4 through the tread portion 2 and sidewall portions 3 and is turned up around the bead core 5 in each of the bead portions 4 from the inside to the outside of the tire so as to form a pair of turned up portions 6b and a main portion 6a therebetween.

The bead portions are each provided between the main portion 6a and turned up portion 6b with a bead apex 8 made of hard rubber having a hardness of from 65 to 99 degrees, more preferably 70 to 95 degrees.

The bead apex 8 extends radially outwardly from the bead core 5 while tapering towards its radially outer end.

The carcass ply turned up portion 6b extends radially outwardly beyond the radially outer end of the bead apex 8, and the radially outer edge 6Ae thereof is positioned radially outside the maximum tire section width point M. In this example, the radially outer edge 6Ae is disposed between the tread reinforcement 7 and the carcass ply main portion 6a.

The sidewall portions 3 are each provided with a sidewall reinforcing rubber layer 13 which tapers towards its radially inner end and outer end from the central portion to have a crescent shape. In this embodiment, the sidewall reinforcing rubber layer 13 is disposed axially inside the carcass 6. The radially outer edge 13A reaches near the outer edge of the tread reinforcement 7. The radially inner edge 13B is positioned radially inside the maximum tire section width point M and slightly overlaps with the bead apex 8. Preferably, the thickness of the sidewall reinforcing rubber layer 13 becomes maximum (T2) in the vicinity of the maximum tire section width point M.

The maximum thickness T2 is preferably set in a range of from 1.3 to 9.0%, preferably 1.8 to 5.0% of a nominal tire section width in millimeters in a metric tire size designating system. For example, in case of "215/45R17" tire size, the nominal tire section width is 215 mm as well known in the tire art.

The radial height SL between the radially outer edge 13A and inner edge 13B of the sidewall reinforcing rubber layer 13 is preferably in a range of from 0.15 to 0.5 times, more preferably 0.2 to 0.4 times the nominal tire section width.

According to the present invention, the tread reinforcement 7 is disposed radially outside the carcass 6 in the tread portion 2. The tread reinforcement 7 comprises a reinforcing rubber layer 9 and at least one reinforcing cord layer 10 disposed radially outside the reinforcing rubber layer 9.

The reinforcing rubber layer 9 extends over the substantially overall tread width TW, and the axial width thereof is in a range of from 60 to 95%, preferably 70 to 90% of the nominal tire section width.

The reinforcing rubber layer 9 is made of a rubber material having a hardness of not less than 70 degrees, preferably not less than 75 degrees, more preferably 76 to 90 degrees, and a loss tangent of not more than 0.15, preferably not more than 0.12, more preferably 0.04 to 0.09.

The tread rubber or the radially outermost rubber layer defining the ground contacting face of the tire has a hardness of about 55 to about 70 degrees which is greater than that of the reinforcing rubber layer 9.

It is also possible to make the reinforcing rubber layer 9 out of two or more different kinds of rubber materials, for example, to use a rubber material having a smaller loss tangent in the central portion of the reinforcing rubber layer which is subjected to a relatively large deformation.

In the tire meridian section, the reinforcing rubber layer 9 has a thickness T1 of not less than 2 mm at the tire equator CP, and the thickness gradually decreases towards each of the axially outer edges 9e thereof. Preferably, the maximum thickness T1 at the tire equator is set in a range of from 3 to 10 mm, more preferably 4 to 10 mm, still more preferably 4 to 8 mm. In this example, the thickness becomes substantially zero at the axially outer edges 9e of the reinforcing rubber layer 9.

Figure 2:
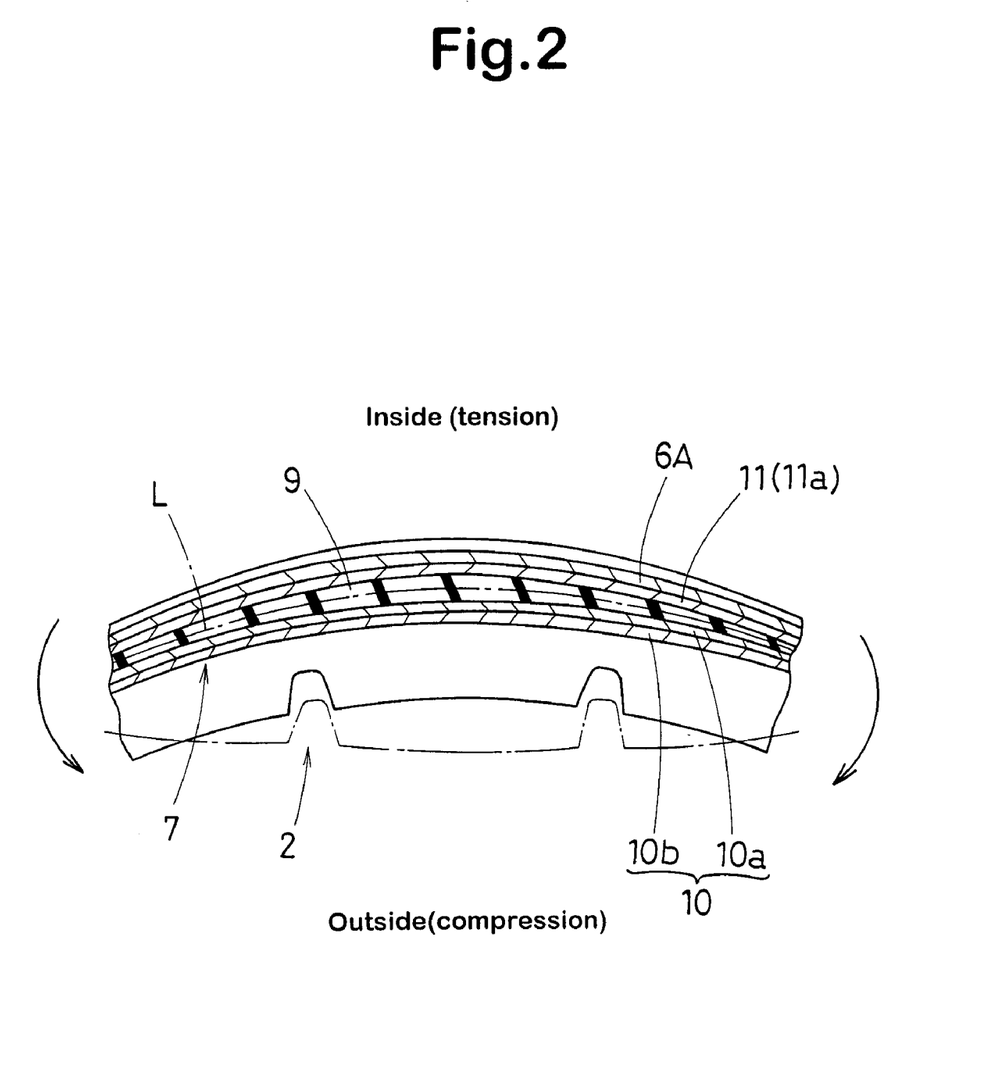
FIG. 2 is a cross sectional partial view of the tread portion thereof which exaggeratedly shows the bending deformation thereof during running flat.

The tread portion 2 of the flat tire is subjected to a bending moment by which the tread crown is caved in and the ground pressure is decreased in the tread crown. By providing the reinforcing rubber layer with a sufficient rubber thickness, the tread reinforcement can withstand such bending moment and the ground pressure distribution becomes even. If the thickness is too large, the durability is liable to decrease. Therefore, the thickness must be satisfy the above-mentioned limitation.

If the hardness of the reinforcing rubber layer 9 is less than 70 degrees, it becomes difficult to withstand the bending deformation during running flat. If the hardness is excessively high, the durability is liable to decrease.

If the loss tangent of the reinforcing rubber layer 9 is more than 0.15, the heat generation during running flat unfavorably increases. If the loss tangent is too small, such material has a tendency to decrease its strength and durability.

Further, the gradually decreasing radius of the tread profile 2a can decrease the bending moment.

Figure 3:
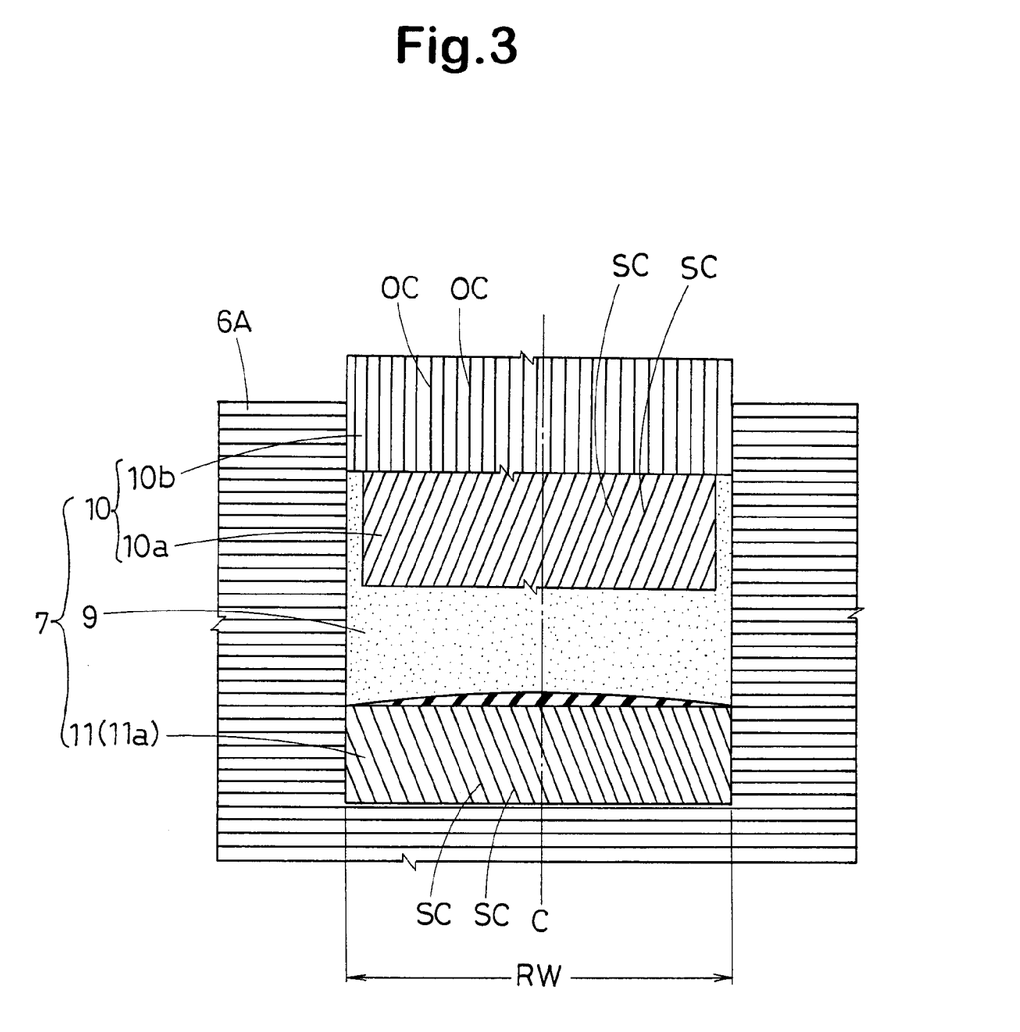
FIG. 3 is a developed view of the tread reinforcement.

In FIGS. 1, 2 and 3 which show an example of the tread reinforcement 7, the tread reinforcement 7 is composed of the reinforcing rubber layer 9, a radially outer reinforcing cord layer 10 and a radially inner reinforcing cord layer 11.

The radially inner reinforcing cord layer 11 is disposed on the carcass crown, and the reinforcing rubber layer 9 is disposed thereon. Further, the radially outer reinforcing cord layer 10 is disposed on the radially outside of the reinforcing rubber layer 9.

The outer reinforcing cord layer 10 is composed of a belt ply 10a of steel cords SC laid at an angle of from 10 to 30 degrees with respect to the tire equator C, and a band ply 10b of organic fiber cords OC disposed on the radially outside of the belt ply 10a at a cord angle of not more than 5 degrees with respect to the tire equator C.

The inner reinforcing cord layer 11 is composed of a belt ply 11a of steel cords SC laid at an angle of from 10 to 30 degrees with respect to the tire equator C in an opposite direction to that of the steel cords SC in the belt ply 10a.

The axial width of the outer reinforcing cord layer 10 and the axial width of the inner reinforcing cord layer 11 are the substantially same as the axial width RW of the reinforcing rubber layer 9. As a result, as the thickness of the reinforcing rubber layer 9 is almost zero at the axial edges, the outer reinforcing cord layer 10 and the inner reinforcing cord layer 11 almost contact with each other at their axial edges, whereby the bending rigidity of the tread reinforcement is effectively increased. Thus, the reinforcing rubber layer can be minimized.

When the tread portion is subjected to a bending moment during running flat, not only the reinforcing rubber layer resists the bending stress but also a tensile stress on the radially inside of the reinforcing rubber layer is resisted by the inner reinforcing cord layer 11 and the carcass and a compressive stress on the radially outside of the reinforcing rubber layer is resisted by the outer reinforcing cord layer 10. Thus, the bending rigidity is greatly increased and the caving-in of the tread crown can be prevented.

Figure 4:
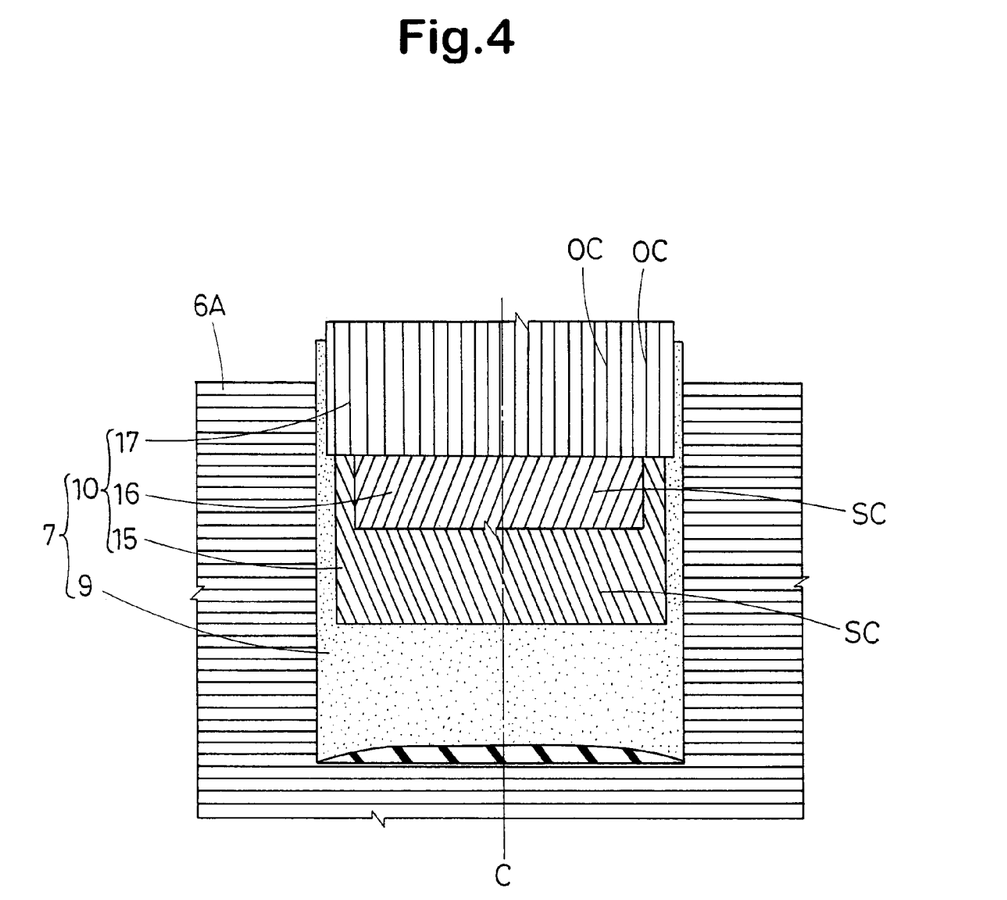
FIGS. 4, 5 and 6 are developed views each showing another example of the tread reinforcement which can be combined with the tire base structure shown in FIG. 1.

FIG. 4 shows another example of the tread reinforcement 7.

In this example, the reinforcing rubber layer 9 is disposed on the carcass crown, and an outer reinforcing cord layer 10 is disposed thereon.

The outer reinforcing cord layer 10 in this example is composed of two cross plies 15 and 16, namely, a radially inner belt ply 15 and a radially outer belt ply 16 disposed thereon, each ply made of parallel steel cords SC laid at an angle of from 10 to 30 degrees with respect to the tire equator C, and a band ply 17 disposed on the radially outside of the radially outer belt ply 16 and made of organic fiber cords OC whose angles are not more than 5 degrees with respect to the tire equator C. Due to the cross plies 15 and 16 arranged closely with each other, the cornering power is improved.

The axial edges of the plies 15, 16 and 17 are not aligned with each other by arranging the ply widths such that the band ply 17 is widest and the radially inner ply 15 is wider than the radially outer ply 16.

As a modification of this type (the rubber layer 9 is directly disposed on the carcass), it may be possible to omit the band ply 17 from the radially outer reinforcing layer 10.

Figure 5:
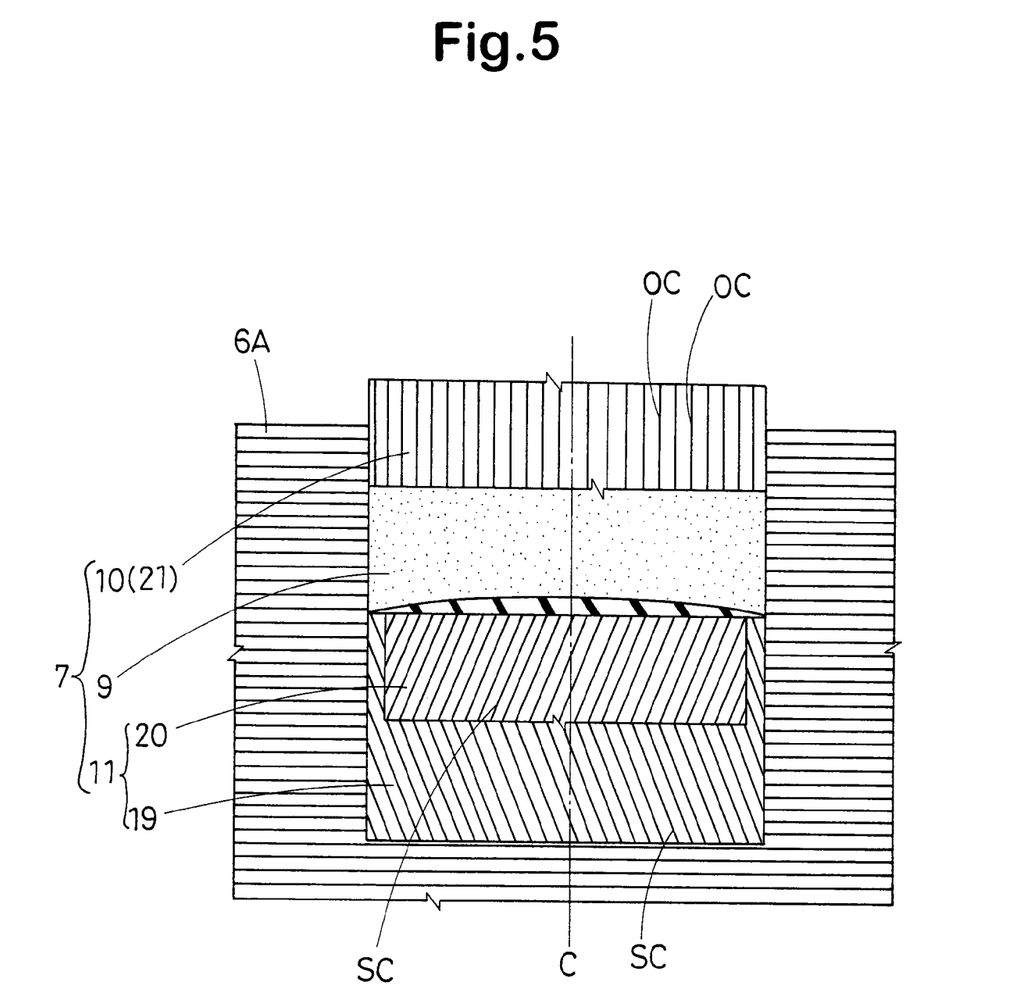

FIG. 5 shows still another example of the tread reinforcement 7.

In this example, the tread reinforcement 7 is composed of an inner reinforcing cord layer 11 dispose on the carcass crown, the reinforcing rubber layer 9 disposed thereon, and an outer reinforcing cord layer 10 disposed on the radially outside of the rubber layer 9.

The outer reinforcing cord layer 10 is composed of a band ply 21 made of organic fiber cords OC whose cord angles are not more than 5 degrees with respect to the tire equator C.

The inner reinforcing cord layer 11 is composed of two cross plies 19 and 20, namely, a radially inner belt ply 19 disposed on the carcass crown, and a radially outer belt ply 20 disposed thereon, each ply made of parallel steel cords SC laid at an angle of 10 to 30 degrees with respect to the tire equator C.

In this type, as the cross belt plies 19 and 20 are disposed far from the ground contacting face, the hardness of the reinforcing rubber layer 9 is preferably set at a relatively high value to prevent the cornering power from decreasing. It is also preferable to use a rubber material having less heat generation property.

Figure 6:
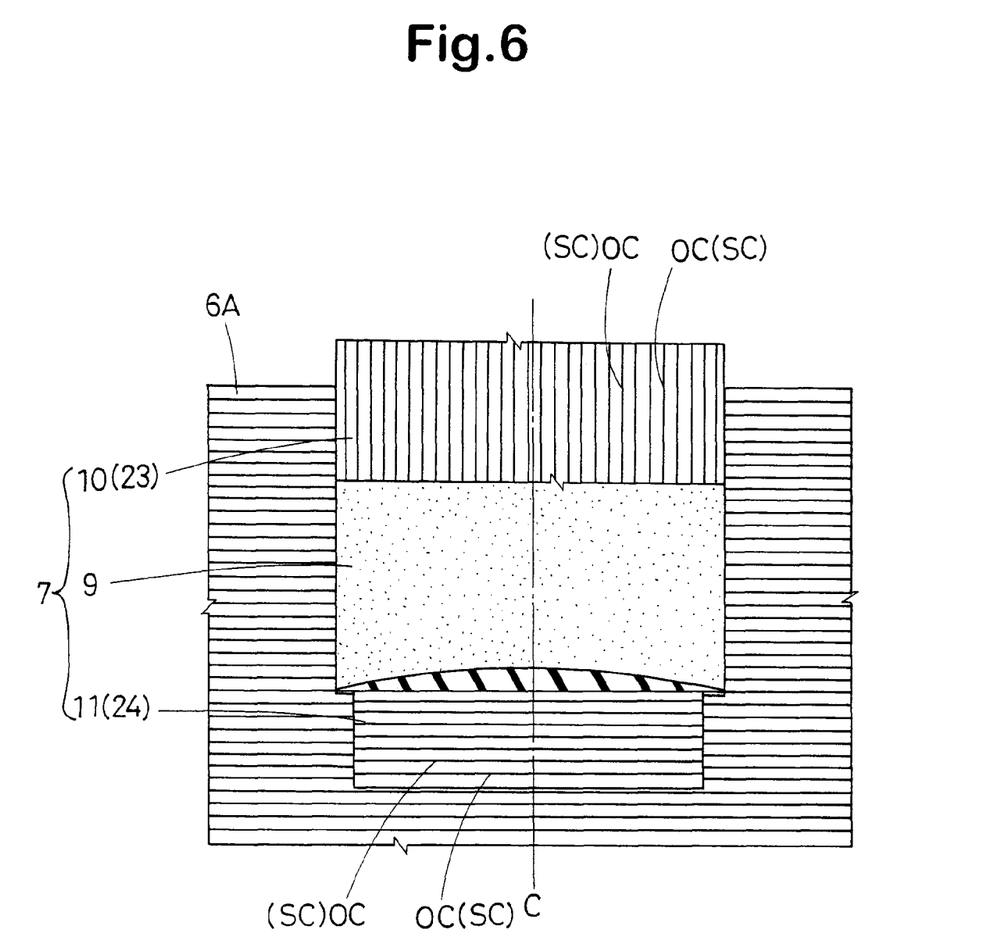

FIG. 6 shows still another example of the tread reinforcement 7.

In this example, the tread reinforcement 7 is composed of an inner reinforcing cord layer 11 dispose on the carcass crown, the reinforcing rubber layer 9 disposed thereon, and an outer reinforcing cord layer 10 disposed on the radially outside of the rubber layer 9.

The inner reinforcing cord layer 11 is composed of a ply 24 of cords laid at an angle of substantially 90 degrees with respect to the tire equator C. For such ply 24, steel cords SC or organic fiber cords OC may be used.

The outer reinforcing cord layer 10 is compose of a band ply 23 made of cords whose cord angles are not more than 5 degrees with respect to the tire equator C. For the band ply 23, steel cords SC or organic fiber cords OC may be used.

In this type, the bending rigidity of the tread portion 2 may be greatly improved because the tensile stress during running flat is resisted by the ply 24 in addition to the carcass ply. However, this cord arrangement has a tendency to decrease the cornering power. Therefore, it is preferable that the steel cords SC are used in both the outer and inner reinforcing cord layers 10 and 11.

In the above-mentioned various examples of the tread reinforcement 7, the belt ply can be formed by winding a strip of rubberized parallel cords. The band ply can be formed by winding a strip of rubberized parallel cords, but preferably, it is formed by spirally winding two to several cords embedded in rubber in a form of tape. The tread reinforcement 7 can be formed using a drum, namely, the optional inner reinforcing cord layer 11 is first formed on the drum, and the reinforcing rubber layer 9 is applied to the outside thereof, and the outer reinforcing cord layer is formed thereon. Further, a tread rubber is applied to the outside of the outer reinforcing cord layer. The assembly of the tread reinforcement 7 and the tread rubber is used to make a green tire together with a separately formed tire main body.

Comparison Test

Test tires of size 215/45ZR17 (wheel rim size :17X7JJ) were made combining the tread reinforcements shown in FIG. 3 to FIG. 6 with the basic structure shown in FIG. 1 excepting the tread reinforcement. And run flat performance was evaluated as follows.

Run-flat distance test: Under a flat condition produced by opening the tire valve, the tire was run on a test drum at a speed of 90 km/hr and a tire load of 4233 N, and the runable distance until tire breakage was measured.

Cornering stability test: Using a 3000 cc Japanese passenger car provided on the right front wheel with the flat test tire, stability during cornering was evaluated into ten ranks by the test driver.

TABLE 1

| Tire | Ex.1 | Ex.1 | Ex.1 | Ex.1 | Ref.1 | Ref.2 | Ref.3 | Ref.4 |
|---|---|---|---|---|---|---|---|---|
| Tread reinforcement | FIG. 3 | FIG. 4 | FIG. 5 | FIG. 6 | *1 | FIG. 3 | FIG. 3 | FIG. 3 |
| Reinforcing rubber layer | | | | | none | | | |
| Hardness (deg.) | 80 | 80 | 80 | 80 | — | 80 | 80 | 80 |
| Loss tangent *2 | 0.052 | 0.052 | 0.052 | 0.052 | — | 0.052 | 0.18 | 0.058 |
| Max. thickness T1 (mm) | 4 | 4 | 4 | 4 | — | 1 | 4 | 4 |
| Width/Nominal width (%) | 84 | 84 | 84 | 84 | — | 84 | 84 | 84 |
| Edges | taper | taper | taper | taper | — | taper | taper | constant thickness |
| Run-flat distance (km) | 230 | 250 | 240 | 250 | 120 | 140 | 150 | 170 |
| Cornering stability | 7 | 8 | 6 | 6 | 6 | 6 | 7 | 4 |

*1 This tire had a structure shown in FIG. 1 from which the reinforcing rubber layer was omitted.
*2 Size of specimen: 4 mm x 30 mm x 1.5 mm As described above, in the pneumatic tires according to the present invention, the tread portion is provided with the reinforcing rubber layer and the radially outer reinforcing cord layer. Therefore, due to the bending rigidity of the relatively hard reinforcing rubber layer and the resistance to compressive stress of the outer reinforcing cord layer and the resistance to tensile stress of the carcass ply, the tread portion can resist bending deformation during running flat, and the ground pressure distribution becomes evened between the tread crown and tread shoulder. Therefore, run-flat performance such as the runable distance, stability during cornering, resistance to heat brakeage and the like are effectively improved. Further, as the tread portion is reinforced as above, it becomes possible to decrease the volume of the sidewall reinforcing rubber layer. Thus, the tread reinforcement can make a contribution to tire weight reduction.

The present invention can be applied to various pneumatic tires aside from passenger car tires. The carcass may have various structures, for example as to the number of the carcass ply, the radial height of the carcass ply turned up portion and the like. Thus, the above-explained tread reinforcements can be combined with various base structures. The base structure means the tire structure excepting the tread reinforcement.

What is claimed is:

1. A pneumatic tire comprising
a tread portion,
a pair of sidewall portions,
a pair of bead portions,
a carcass extending between the bead portions, and
a tread reinforcement disposed radially outside the carcass in the tread portion and comprising a radially inner reinforcing cord layer disposed on the carcass crown, a reinforcing rubber layer disposed thereon, and a radially outer reinforcing cord layer disposed radially outside of the reinforcing rubber layer,
the radially outer reinforcing cord layer composed of a first belt ply of cords laid at an angle of from 10 to 30 degrees with respect to the tire equator, and a band ply made of cords disposed radially outside of the first belt ply at a cord angle of not more than 5 degrees with respect to the tire equator,
the radially inner reinforcing cord layer composed of a second belt ply of cords laid at an angle of from 10 to 30 degrees with respect to the tire equator in an opposite direction to that of the cords in the first belt ply,
each said sidewall portion is provided on the axially inside of the carcass with a sidewall reinforcing rubber layer, which tapers towards its radially inner end and outer end from a central portion to have a crescent shape in a meridian section of the tire,
the reinforcing rubber layer extending across the substantially overall tread width and made of a rubber material having a JIS-A hardness of not less than 70 degrees and a loss tangent of not more than 0.15 measured at a temperature of 70 degrees C., a frequency of 10 Hz, and a dynamic distortion of plus/minus 2%,
in a tire meridian section, the thickness of the reinforcing rubber layer being in a range of not less than 2 mm at the tire equator and gradually decreasing towards the axial edges of the reinforcing rubber layer; and wherein in a meridian section of the tire under a normally inflated unloaded condition, the tire has a profile of the tread portion or continuing through the tread portion to a maximum tire section width point in each of the sidewall portions where the radius of the curvature gradually decreases towards the axially outside of the tire from the tire equator.

2. A pneumatic tire comprising
a tread portion,
a pair of sidewall portions,
a pair of bead portions,
a carcass extending between the bead portions, and
a tread reinforcement disposed radially outside the carcass in the tread portion and comprising a reinforcing rubber layer and a radially outer reinforcing cord layer,
the radially outer reinforcing cord layer composed of two cross plies which are a radially inner belt ply and a radially outer belt ply disposed thereon, each ply made of parallel cords laid at an angle of from 10 to 30 degrees with respect to the tire equator, and a band ply disposed radially outside of the radially outer belt ply and made of cords disposed at a cord angle of not more than 5 degrees with respect to the tire equator,
each said sidewall portion is provided on the axially inside of the carcass with a sidewall reinforcing rubber layer, which tapers towards its radially inner end and outer end from a central portion to have a crescent shape in a meridian section of the tire,
the reinforcing rubber layer extending substantially across the overall tread width and made of a rubber material having a JIS-A hardness of not less than 70 degrees and a loss tangent of not more than 0.15 measured at a temperature of 70 degrees C., a frequency of 10 Hz, and a dynamic distortion of plus/minus 2%,
in a tire meridian section, the thickness of the reinforcing rubber layer being in a range of not less than 2 mm at the tire equator and gradually decreasing towards the axial edges of the reinforcing rubber layer; and wherein in a meridian section of the tire under a normally inflated unloaded condition, the tire has a profile of the tread portion or continuing through the tread portion to a maximum tire section width point in each of the sidewall portions where the radius of the curvature gradually decreases towards the axially outside of the tire from the tire equator.

3. A pneumatic tire comprising
a tread portion,
a pair of sidewall portions,
a pair of bead portions,
a carcass extending between the bead portions, and
a tread reinforcement disposed radially outside the carcass in the tread portion and composed of a radially inner reinforcing cord layer disposed on the carcass crown, a reinforcing rubber layer disposed thereon, and a radially outer reinforcing cord layer disposed radially outside of the reinforcing rubber layer,
the radially outer reinforcing cord layer composed of a band ply made of cords disposed at a cord angle of not more than 5 degrees with respect to the tire equator,
the radially inner reinforcing cord layer composed of two cross plies which are a radially inner belt ply disposed on the carcass crown, and a radially outer belt ply disposed thereon, each ply made of parallel cords laid at an angle of from 10 to 30 degrees with respect to the tire equator,
each said sidewall portion is provided on the axially inside of the carcass with a sidewall reinforcing rubber layer, which tapers towards its radially inner end and outer end from a central portion to have a crescent shape in a meridian section of the tire,
the reinforcing rubber layer extending substantially across the overall tread width and made of a rubber material having a JIS-A hardness of not less than 70 degrees and a loss tangent of not more than 0.15 measured at a temperature of 70 degrees C., a frequency of 10 Hz, and a dynamic distortion of plus/minus 2%, in a tire meridian section, the thickness of the reinforcing rubber layer being in a range of not less than 2 mm at the tire equator and gradually decreasing towards the axial edges of the reinforcing rubber layer; and wherein in a meridian section of the tire under a normally inflated unloaded condition, the tire has a profile of the tread portion or continuing through the tread portion to a maximum tire section width point in each of the sidewall portions where the radius of the curvature gradually decreases towards the axially outside of the tire from the tire equator.

4. A pneumatic tire comprising a tread portion, a pair of sidewall portions, a pair of bead portions, a carcass extending between the bead portions, and a tread reinforcement disposed radially outside the carcass in the tread portion and composed of a radially inner reinforcing cord layer disposed on the carcass crown, a reinforcing rubber layer disposed thereon, and a radially outer reinforcing cord layer disposed radially outside of the reinforcing rubber layer, the radially inner reinforcing cord layer composed of a belt ply of cords laid at an angle of substantially 90 degrees with respect to the tire equator, the radially outer reinforcing cord layer composed of a band ply made of cords disposed at a cord angle of not more than 5 degrees with respect to the tire equator, each said sidewall portion is provided on the axially inside of the carcass with a sidewall reinforcing rubber layer, which tapers towards its radially inner end and outer end from a central portion to have a crescent shape in a meridian section of the tire, the reinforcing rubber layer extending substantially across the overall tread width and made of a rubber material having a JIS-A hardness of not less than 70 degrees and a loss tangent of not more than 0.15 measured at a temperature of 70 degrees C., a frequency of 10 Hz, and a dynamic distortion of plus/minus 2%, in a tire meridian section, the thickness of the reinforcing rubber layer being in a range of not less than 2 mm at the tire equator and gradually decreasing towards the axial edges of the reinforcing rubber layer; and wherein in a meridian section of the tire under a normally inflated unloaded condition, the tire has a profile of the tread portion or continuing through the tread portion to a maximum tire section width point in each of the sidewall portions where the radius of the curvature gradually decreases towards the axially outside of the tire from the tire equator.

5. A pneumatic tire according to claim 1, 2, 3 or 4, wherein the belt ply cords are steel cords, and the band ply cords are organic fiber cords.

6. A pneumatic tire comprising a tread portion, a pair of sidewall portions, a pair of bead portions, a carcass extending between the bead portions, and a tread reinforcement disposed radially outside the carcass in the tread portion and comprising a reinforcing rubber layer and a radially outer reinforcing cord layer, the radially outer reinforcing cord layer composed of two cross plies which are a radially inner belt ply and a radially outer belt ply disposed thereon, each ply made of parallel cords laid at an angle of from 10 to 30 degrees with respect to the tire equator, each said sidewall portion is provided on the axially inside of the carcass with a sidewall reinforcing rubber layer, which tapers towards its radially inner end and outer end from a central portion to have a crescent shape in a meridian section of the tire, the reinforcing rubber layer extending substantially across the overall tread width and made of a rubber material having a JIS-A hardness of not less than 70 degrees and a loss tangent of not more than 0.15 measured at a temperature of 70 degrees C., a frequency of 10 Hz, and a dynamic distortion of plus/minus 2%, in a tire meridian section, the thickness of the reinforcing rubber layer being in a range of not less than 2 mm at the tire equator and gradually decreasing towards the axial edges of the reinforcing rubber layer; and wherein in a meridian section of the tire under a normally inflated unloaded condition, the tire has a profile of the tread portion or continuing through the tread portion to a maximum tire section width point in each of the sidewall portions where the radius of the curvature gradually decreases towards the axially outside of the tire from the tire equator.

7. A pneumatic tire according to claim 1, 2, 3, 4, or 6, wherein the gradual decreasing of the radius of curvature of the profile continues to the maximum tire section width point in each of the sidewall portions.

* * * * *